Figure 1:
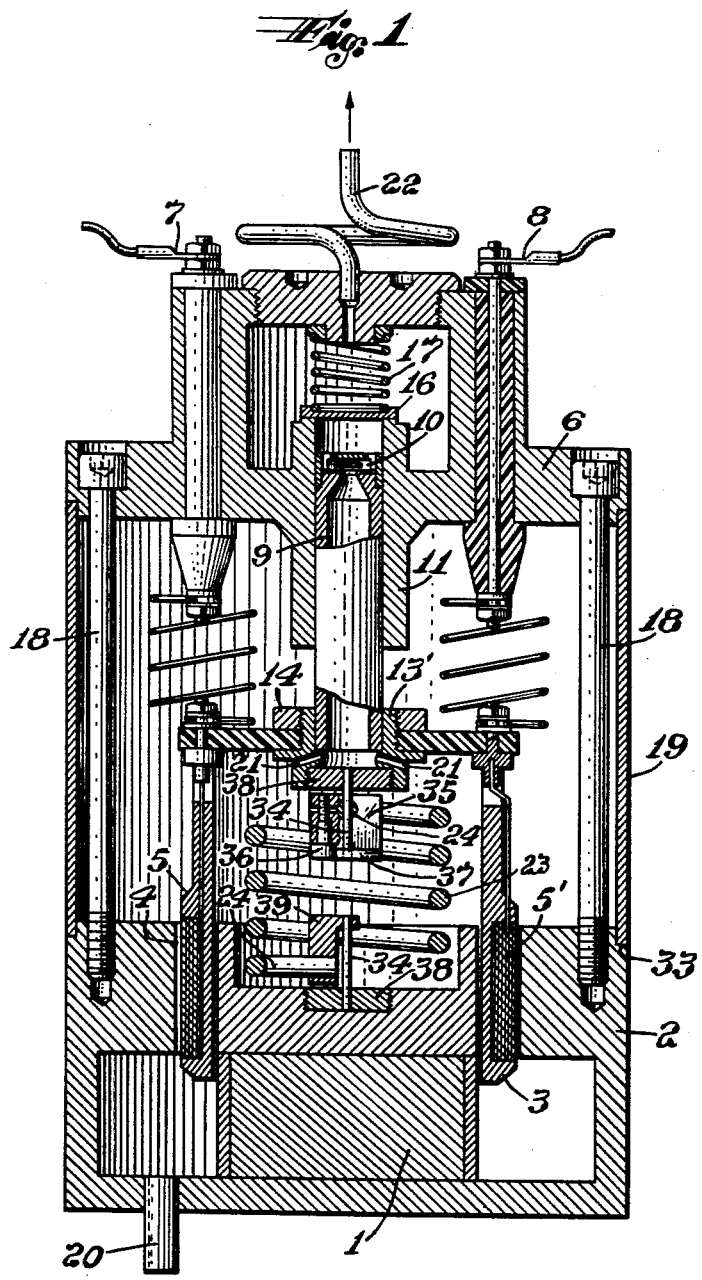

INVENTOR.
Heinrich Dölz

United States Patent Office 3,143,281
Patented Aug. 4, 1964

3,143,281
ELECTROMAGNETIC OSCILLATING DRIVE, MORE PARTICULARLY FOR PLUNGER COMPRESSORS
Heinrich Dölz, Jahnstrasse 31, Seligenstadt, Germany
Filed July 10, 1962, Ser. No. 208,872
Claims priority, application Germany July 11, 1961
7 Claims. (Cl. 230—55)

This invention relates to an electrical oscillating drive, more particularly an electrodynamic oscillating drive for plunger compressors, in which the oscillating armature and the plunger or plungers connected to the armature are supported on the compressor casing, more particularly on the stationary portion of the oscillating drive, for instance the core magnet, by means of coaxially acting helical springs or the like. In these driving systems for compressors, pivotal connection points are interposed, on the axis of oscillation, between the plunger and the oscillating spring or between the oscillating spring and the point of support for this spring, and this arrangement ensures that the plunger is not subjected to forces acting unilaterally on the plunger, or transverse forces, during the spring movement. The connection points are formed by ball and socket joints which ensure that the points of action of the support spring lie on the axis of oscillation even during operation and are mounted rotatably about any axis perpendicular to the axis of oscillation, and about this axis itself in certain cases. In plunger compressors constructed in this way, it is found that owing to settling of the bearings the ball and socket joints do not remain free from play for any great length of time. The play that arises has no serious effect on the operation of the apparatus and usually affects the power consumption advantageously because of the easy motion of compressors constructed in this way; but this play causes noise to be produced at the pivot points, and the present invention aims to eliminate this noise.

According to the invention, this is achieved by a construction in which the oscillating spring acts on the plunger or on the part of the oscillating drive that is rigid with the casing, or on both, through intermediate members which are resiliently deflected transversely to the axis of the spring. These intermediate members form joints free from play, in which settling of the bearings is impossible even after a long period of operation, so that the action of transverse forces on the plunger and the production of noise are advantageously prevented.

According to a further feature of the invention, the intermediate members are preferably formed by bars or the like made from a resilient elastic material, for instance steel, and extending at least approximately along the longitudinal axis of the spring. The bars formed so-called bending bars which bend about their longitudinal axis under the action of forces acting transversely to the spring axis and thus ensure rectilinear guiding of the plunger without jamming. In order to increase the sensitivity to resilient deflection, the diameter of the bars is made less than the diameter of the spring. It has been found that in the small ranges of angular movement in which they act, joints formed in this way advantageously perform a function corresponding to that of ball bearings, without any disadvantageous effect on the power consumption. Another particular advantage is the ease of manufacture of the bars serving as intermediate members, and the fact that the assembly of the compressor is facilitated by the use of these bars.

According to a further feature of the invention, the resilient elastic bars are releasably connected to the ends of the oscillating spring and/or to the plunger or the part of the oscillating drive rigid with the casing. When releasably attached, the bars can be removed and replaced and can be accurately adjusted in the drive system. The bars are attached to the spring ends preferably by means of clamping members, for instance straps, shackles or the like, which can be slid on to the spring wire and secured in position for instance by tightening screws. The straps permit the bars to be accurately aligned with the axis of the spring after the clamping screws have been released. The bars may be rigidly secured to the clamping members, for instance by welding, soldering or the like or by upsetting their free ends. But it is also possible to connect the bars to the clamping members releasably, for instance by means of threaded shoulder formed on the bars, or the like.

According to a further feature of the invention, the bars may be secured by means of frustoconically shaped collars or the like which are arranged on the bar ends and positively engage in recesses in threaded rings. The attachment of the bars by means of frustoconically shaped collars is a particularly simple form of releasable connection.

Instead of arranging bars at both ends of the oscillating spring it is also possible, according to a further feature of the invention, to use a bar, which is resiliently deflected transversely to the axis of the spring, at only one end of the spring, whereas the other end of the spring acts on the other part of the oscillating drive directly, i.e. rigidly. It will be understood that when only one resilient bar is used, this bar acts at the end of the spring remote from the plunger. The spring thus bears, so to speak, pivotally against the part of the drive rigid with the casing, and is rotatable about this part in all directions transversely to the axis of oscillation.

Figure 2:
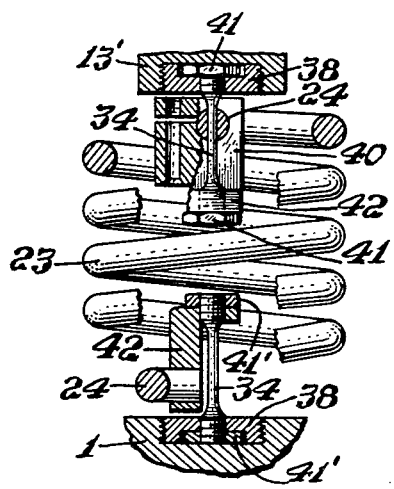
Figure 4:
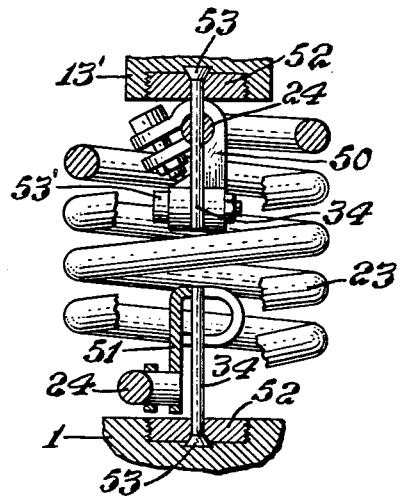
Figure 3:
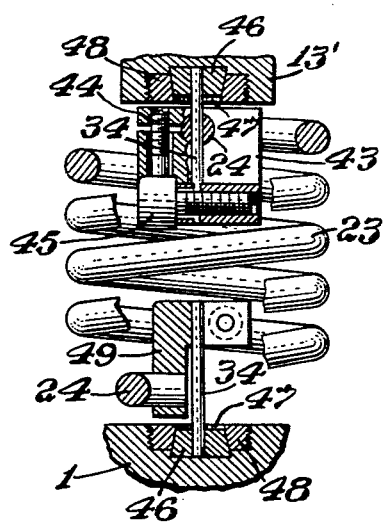
Figure 5:
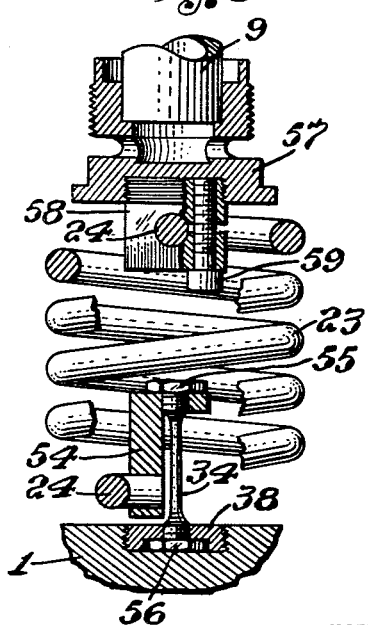

Embodiment of the invention chosen by way of example are illustrated in the accompanying drawings, in which:

FIGURE 1 shows a plunger compressor with dynamic drive, constructed in accordance with the invention, in longitudinal section, FIGURE 2 shows one form of attachment of an oscillating spring in accordance with the invention, partly in side elevation and partly in section, on a larger scale, FIGURE 3 shows another form of attachment of an oscillating spring, also partly in side elevation and partly in section, FIGURE 4 shows a further form of attachment of an oscillating spring, partly in side elevation and partly in section, and FIGURE 5 shows an oscillating spring clamped at one end, partly in side elevation and partly in section.

A permanent magnet 1 of a dynamic oscillating drive is provided with a pot-shaped pole ring 2 made of soft magnetic material. An oscillating coil 3 extends into and is freely movable in an annular gap 4 formed between the magnet and the pole ring. The oscillating coil 3 is provided with a carrier 5, made of non-magnetic material, for the winding 5'. Through leads 7 and 8 the winding is connected for instance to an alternating current supply system, so that the electrodynamic drive oscillates at the frequency of the alternating current supplied. A compressor plunger 9 connected to the oscillating coil 3 is longituidnally displaceably accommodating in a compressor cylinder 11. The plunger is connected to the oscillating coil 3 through the intermediary of a hollow threaded collar 13', as shown in FIGURE 1. Rigid connection is obtained by means of a ring 14' screwed on to the collar. The compressor cylinder 11 is arranged in a compressor casing 6. This cylinder communicates with a collecting chamber 12 through an outlet valve 16 loaded by a spring 17. The casing portion 6 of the compressor is rigidly connected to the pot-shaped pole ring 2 of the oscillating drive by screws 18 so that the ring 2 and the casing 6 jointly constitute the support structure of the apparatus. A sleeve 19 guided in recesses 33 is inserted between the casing portion 6 and the pole ring 2 and forms the jacket of the oscillating compressor. The sleeve 19 also performs the necessary function of centering the cylinder 11 with respect to the annular gap 4. An intake pipe 20 leads into the pot-shaped pole ring 2; the gaseous medium flows through this pipe into the inner coil chamber of the oscillating compressor; after flowing through the annular gap 4 this medium passes into the hollow chamber in the plunger 9 through bores 21 in the threaded collar 13'. During the downward movement of the plunger the gaseous medium passes into the compression chamber of the plunger through an intake valve 10 arranged in the plunger 9, and from this chamber into the pressure chamber 12 and an outlet pipe 22. 23 is a helical spring used as an oscillating spring for supporting the oscillating coil and the plunger 9. The spring 23 has spring ends 24 bent inwards in the direction of the spring axes; in accordance with the invention these ends are connected respectively to the plunger 9 and the core magnet 1 through the intermediary of resilient steel bars 34 of which the axes normally coincide with the axis of the spring and the axis of oscillation. In the embodiment illustrated in FIGURE 1, the end 24 of the spring 23 adjacent to the plunger carries a shackle 35 which is slid from the side on to the end 24 and can be secured in position by tightening a clamping screw 36. The shackle 35 is provided with a bent portion 37 on which the end of the bar 34 acts and to which this end is rigidly secured for instance by welding. The free end of the bar 34 is inserted into a threaded ring 38 which can be secured into the threaded collar 13'. The bar 34 is also rigidly connected to the threaded ring 38, for instance by welding. For securing the bar 34 at the end of the spring 23 adjacent to the magnet, a strap 39 is provided which surrounds and clamps the bent lower end of the spring 23. The bar 34 is also connected to the strap by welding. The free end of the bar engages in a threaded ring 38 which can be screwed into a threaded bore in the core magnet 1. The bar and the threaded ring are rigidly interconnected by welding.

When the compressor is in operation, the oscillating spring 23 supports the oscillating system on the core magnet 1 which is rigid with the casing. The transverse forces that arise are absorbed by the bendable bars 34 which are resiliently deflected transversely to the axis of the spring. These bars bend under the action of the transverse forces and act in the manner of pivot joints ensuring that the points of action of the spring 23 are always shifted on to the prolongation of the axis of the plunger. The pivot points free from play that are formed in the manner also ensure that the production of noise is impossible, even after the apparatus has been in use for a long time. It is advisable to make the diameter of the lower bar 34, which is connected to the casing, larger than that of the upper bar, because the lower bar is subjected to somewhat higher stresses, as can be seen from FIGURE 1.

In the embodiment illustrated in FIGURE 2, the spring 23 is formed in the manner described above, and bars 34 which are deflected transversely to the axis of the plunger are arranged on the bent ends 24 of this spring; the longitudinal axis of the bars coincides with the axis of oscillation. In contradistinction to the embodiment described above, the bar 34 extending towards the plunger is screwed into a bent portion 42 of a shackle 40 which is secured to the end of the spring by tightening a clamping screw. The free end of the bar is screwed into a threaded ring 38. The threads of the bar 34 carry lock nuts 41 securing the bar against accidental release. The bar 34 arranged at the end adjacent to the magnet is releasably connected to the spring end 24 by being screwed into a clamping strap 42 placed on the spring end 24, and to the core magnet 1 through the intermediary of a threaded ring 38. Discs 41' also located on the threaded shoulders of the bar prevent accidental release of the bar connection.

In the embodiment illustrated in FIGURE 3, the spring is formed as described above; a clamping shackle 43 placed on the spring end 24 also retains the bar 34 by clamping. Screws 44 and 45 when tightened provide the necessary stresses. In contradistinction to the embodiments illustrated in FIGURES 1 and 2, the bar 34 carries, at its end adjacent to the plunger, a frustoconically shaped collar 46 engaging in a correspondingly shaped recess 47 in a threaded ring 48. The threaded ring 48 can be screwed into the bottom end of the plunger. The bar 34 located at the end adjacent to the magnet is also secured in a threaded ring 48 by means of a frustoconically shaped collar 46. The bar is attached to the spring end 34 by means of a strap 49. When the two threaded rings 48 are screwed into the plunger and into the core magnet respectively, the interval between the threaded rings increases, whereby positive contact between the frustoconically shaped collars 46 and the recesses 47 in the threaded rings can be obtained.

In the embodiment illustrated in FIGURE 4, the spring is formed in the manner described above, and the bars 34 are connected to the spring ends 24 by means of clamping shackles 50 and 51. The free ends of the bars are inserted into threaded rings 52. These ends carry widened portions 53 which provide a secure hold when the threaded rings 52 are screwed into the plunger and the magnet respectively. The widened portions are frustoconically shaped, as shown in the drawing, and are formed by upsetting. The upper bar 34 is adjustably attached by means of a clamping screw 53', whereby the parts used for attachment can be accurately aligned.

In the embodiment illustrated in FIGURE 5, the end 24 of the helical spring 23 adjacent to the magnet carries a clamping strap 54, into which the bar 34 is screwed. The other end of the bar 34 is inserted into a threaded ring 38 which can be screwed for instance into the core magnet 1. Lock nuts 55 and 56 secure the screw connections against accidental release.

In contradistinction to the embodiments described above, the end 24 of the spring 23 adjacent to the plunger is rigidly connected to the plunger 11. For this purpose the plunger carries a sleeve 57 into which a clamping shackle 58 can be screwed. A clamping screw 59 is inserted into the shackle, and this screw when tightened provides the necessary clamping stress for securing the upper end 24 of the spring in the clamping shackle. The spring end adjacent to the plunger is thus connected rigidly to the plunger. It has been found that the plunger remains largely free from transverse forces even when a transversely deflectable bar is arranged only at one end of the spring 23. The bar 34 forms a pivot joint which ensures that the points of action of the spring will be shifted on to the prolongation of the axis of the plunger.

The apparatus of this invention can also be used for ordinary electromagnetic oscillating drives with single or double spring adjustment of the oscillating armature, provided that the axes of the spring or springs lie on the axis of oscillation.

What is claimed is:

1. A compressor arrangement comprising, in combination:
   (a) a support member;
   (b) a cylinder on said support member, said cylinder having an axis;
   (c) a plunger member axially slidable in said cylinder;
   (d) electromagnetic means for moving said plunger member in said cylinder in one axial direction;
   (e) helical spring means coaxial with said cylinder for urging said plunger member to move in the other axial direction, said spring means having two axially spaced end portions; and
   (f) two fastening means respectively fastening said end portions to said plunger member and to said support member,
       (1) at least one of said fastening means including yieldably resilient means urging the associated end portion transversely of said axis toward a predetermined position of axial alignment with said cylinder.

2. A compressor as set forth in claim 1, wherein said one fastening means includes a normally axially elongated bar of resilient material, said bar having two terminal portions respectively rigidly secured to the associated end portion of said spring means and to one of said members.

3. A compressor as set forth in claim 1, wherein said one fastening means includes a normally axially elongated bar of resilient material, said bar having two terminal portions, and two securing means respectively rigidly securing said terminal portions to the associated end portion of said spring means and to one of said members.

4. A compressor as set forth in claim 3, wherein one of said securing means is releasable.

5. A compressor as set forth in claim 2, wherein said bar is normally elongated coaxially with said spring means.

6. A compressor as set forth in claim 1, wherein each of said fastening means includes a normally axially elongated bar of resilient material, one of said bars having two terminal portions respectively rigidly secured to one of the end portions of said spring means and to said support member, and the other one of said bars having two terminal portions respectively rigidly secured to the other end portion of said spring means and to said plunger member.

7. A compressor as set forth in claim 6, wherein said bars are normally elongated coaxially with said spring means.

References Cited in the file of this patent

UNITED STATES PATENTS 3,007,625    Dölz _____ Nov. 7, 1961

FOREIGN PATENTS 1,086,463    France _____ Feb. 14, 1955